350-312
2/21/78 XR 4,074,482
SR

United States Patent [19]

Klahr

[11] 4,074,482

[45] Feb. 21, 1978

[54] RADIATION REFLECTING BUILDING

[76] Inventor: Carl N. Klahr, 678 Cedar Lawn Ave., Lawrence, N.Y. 11559

[21] Appl. No.: 647,934

[22] Filed: Jan. 9, 1976

[51] Int. Cl.[2] .......... B32B 1/05

[52] U.S. Cl. .......... 52/171; 350/312

[58] Field of Search .......... 52/2, 304, 308, 171, 52/168; 350/1, 312

[56] References Cited

U.S. PATENT DOCUMENTS

| | | | |
|---|---|---|---|
| 1,428,056 | 9/1922 | Pegler | 52/168 |
| 2,373,214 | 4/1945 | Wolkenhauer | 52/171 |
| 2,439,553 | 4/1948 | Winn | 52/171 |
| 2,501,418 | 3/1950 | Snowden | 52/171 |
| 2,537,011 | 1/1951 | Aparico | 350/312 |
| 3,470,049 | 9/1969 | Reusch | 52/171 |
| 3,475,868 | 11/1969 | Johnson | 52/2 |

*Primary Examiner*—John E. Murtagh
*Attorney, Agent, or Firm*—Browdy and Neimark

[57] ABSTRACT

This invention comprises structures for providing shelter at low cost by reflecting a high fraction of the optical and thermal radiation incident on the walls from the outside, or by reflecting a high fraction of the thermal radiation incident on the walls from inside. The structures are composed of translucent container modules attached to a framework, said container modules holding a translucent liquid, foam or gel medium with a dispersion of microparticles which can reflect or absorb the spectrum of radiation impinging on it. These containers incorporate into themselves thermal insulators for minimizing thermal conduction and means for minimizing thermal convection.

37 Claims, 3 Drawing Figures

FIG. 1
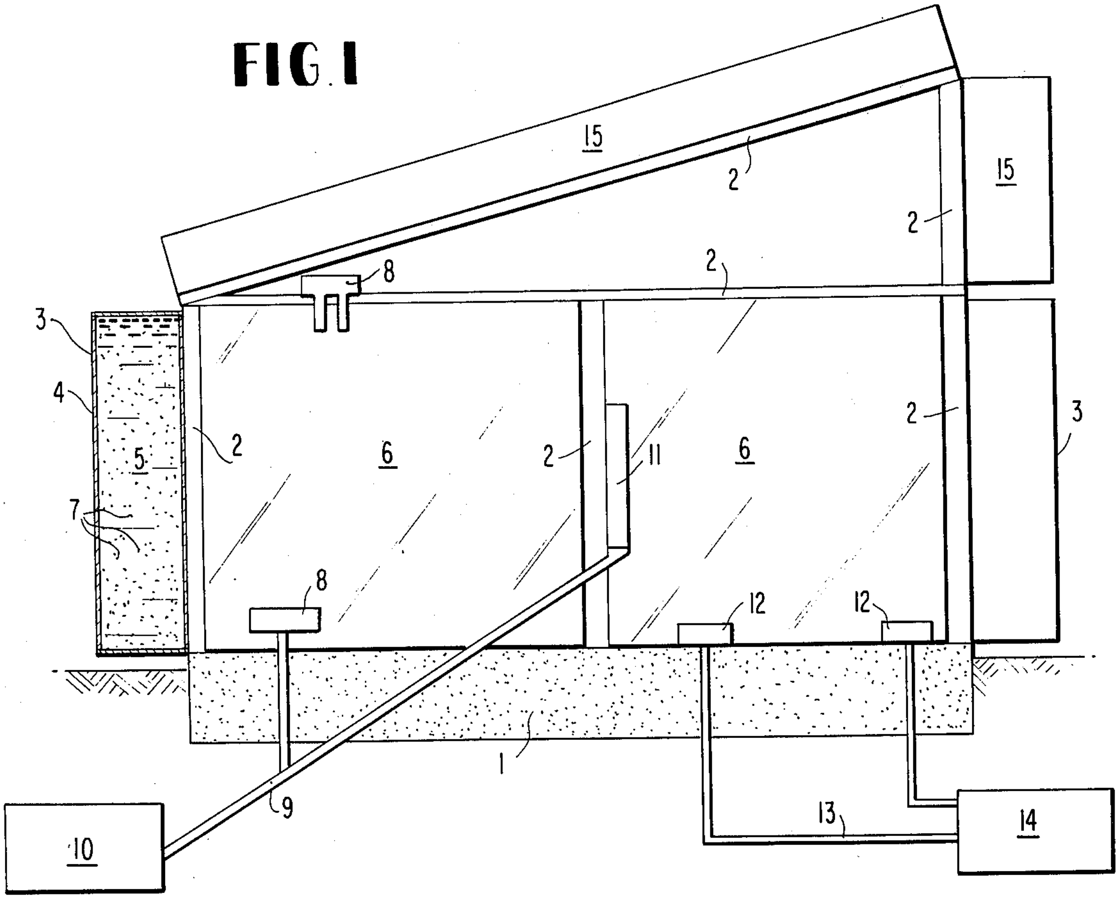
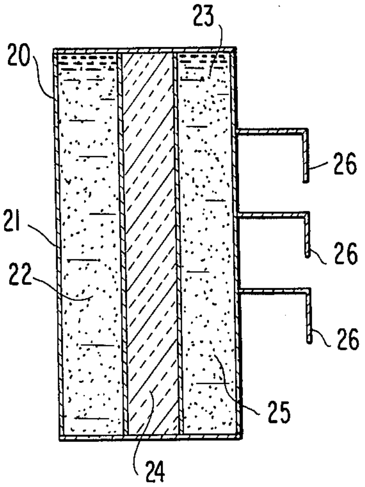
FIG. 2
FIG. 3
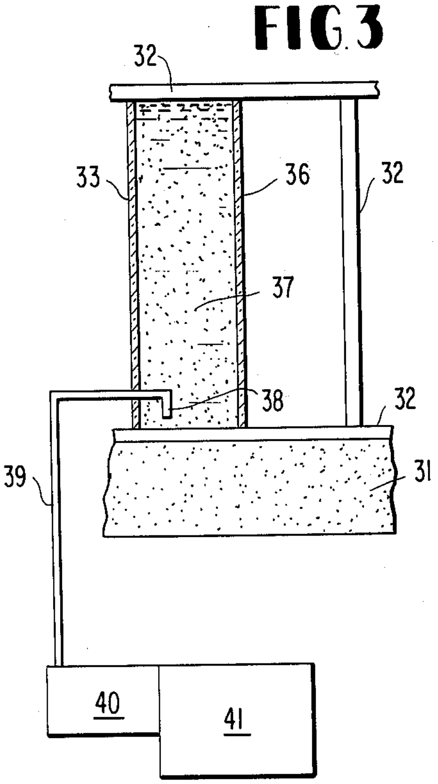

RADIATION REFLECTING BUILDING

This invention relates generally to enclosures, structures and buildings for providing shelter and protection from weather, cold and heat. More specifically it is concerned with radiation reflecting buildings, that is, with enclosures which provide such shelter at low cost and with high performance effectiveness by preventing the entrance of optical or thermal radiation or radiant heat into the enclosure area when the enclosure is to be kept cool, by reflecting a high fraction of the radiation incident from outside the structure. Conversely, it is concerned with radiation reflecting buildings which prevent the escape of thermal radiation or radiant heat from within the enclosed area to the outside, when the enclosed area is to be kept warm, by reflecting a high fraction of the radiation incident on the walls from the inside of the structure. This invention relates not only to reflection of radiation by the building but to facilitating the transmission of radiation, when said transmission is necessary for improving the shelter qualities of said building or structure. It is also concerned with means and structures for reflection of radiation which also incorporate within themselves thermal insulation for minimizing thermal conduction and means for minimizing thermal convection by wind and air streams.

It will be understood that the term optical radiation will include not only visible electromagnetic radiation but ultraviolet radiation from wavelengths of 0.1 microns to about 0.45 microns and infrared radiation extending from wavelengths of 0.7 microns to 100 microns and more. This infrared radiation is often referred to as radiant heat.

One object of the present invention is to provide a structure whose surface has high reflectance for incident optical radiation as well as for infrared and ultraviolet radiation, including radiant heat, when such broad spectrum reflection is required. A related objective is to provide a higher reflectance than can be obtained using paint. A related objective is to minimize the fraction of incident radiation which is absorbed by the wall of the structure, and to obtain lower thermal absorption than any paint can provide. Related to this purpose is that of minimizing the effects of dirt deposition and weathering of the surface, which impair the reflectance of paints and increase their absorption of radiation. It is the purpose of the present invention to provide these favorable qualities in a structure of low weight and low material cost, and with low cost of fabrication and erection. It is also the purpose of this invention to provide building blocks, panels and walls for a structure whose surface has a higher reflectance and lower absorption of incident optical and thermal radiation than can be obtained with a painted surface.

Another objective of the present invention is to provide a structure which will produce the greenhouse effect in which ultraviolet radiation from the outside may enter while infrared radiation, radiant heat, and some optical radiation is excluded; while infrared radiation and radiant heat from the interior are retained and prevented from escaping, said greenhouse effect being advantageous for utilizing sun radiation for heating said structure and substantially retaining said heat. An opposite objective of this invention is to provide a structure which excludes the entrance of ultraviolet radiation from outside the enclosure while permitting infrared radiation and radiant heat from within the enclosure to be transmitted to the outside, said preferential reflection of ultraviolet radiation and transmission of infrared radiation being advantageous for preventing sunlight radiation from heating the structure. A related objective is to provide a structure which can alternately display each of these properties.

Another objective of the present invention is to provide wall panels and building blocks with any of the above described properties, and to provide panels and building blocks whose reflectance and transmittance of optical and infrared radiation, and of the color of the radiation transmitted can be controlled and modified. Another objective is to provide a structure or panels which have any of the above properties while utilizing lightweight frames or girders as the support structure, and which can be fabricated at low cost.

It is the purpose of the present invention to provide each of these properties in a structure that combines very effective insulation to thermal conduction with favorable radiation reflection properties. It is also the purpose of the present invention to provide each of these properties in a structure that combines blockage or buffering of thermal convection currents by air streams with favorable radiation reflection properties.

These and other objectives of the present invention can be accomplished by means of various structural embodiments to be described, which can be diverse in nature but all of which operate according to common principles. In particular this invention is concerned with structures composed of container modules, modular sections, or container panels attached to a framework, wherein the container modules are composed of radiation transparent or translucent materials holding a liquid, foam, or gel medium, with a dispersion of microparticles which can reflect or absorb the spectrum of radiation impinging on it within certain limits of radiation wavelengths. The term radiation transparent as applied to the container modules will be understood to mean transparency to any or all of the wavelengths considered, including ultraviolet, visible, and infrared radiation.

The terms transparent and translucent will be understood as follows: a material which does not substantially scatter or absorb optical radiation is termed transparent; a material which does not substantially absorb optical radiation but may scatter it is termed translucent. In this usage it will be understood that the term translucent is more inclusive. Transparent materials are included in the category of translucent, but translucent materials need not be transparent. The important property for the container and the dispersion medium are that they be translucent; transparency is not necessary.

The terms module or modular as applied to the container refer to its being fabricated or assembled in self-contained sections wherein each such section exhibits independently the properties described. It does not refer to size or shape of the container nor to the separate container modules being identical to one another; however in many designs the modules may be identical to each other for reasons of economy or convenience.

In this disclosure it will be useful first to summarize the basic principles (which have been combined to give the design methods) on which the present invention is based, and then secondly to describe the structural embodiments of the present invention. The basic principles may be summarized as follows:

The radiation reflecting material will be in the form of particles of very small diameter, e.g., of the order of tens of microns to fractions of a micron in diameter.

These particles will be termed microparticles. The microparticles are dispersed in a transparent or translucent medium, e.g., in a liquid such as water, in the form of very large numbers of individually separated particles. The reflecting material in microparticle form will have a very large reflecting area per unit mass because of the small particle size.

This dispersion of microparticles will be held in modular containers, panels or wall sections whose reflecting faces will be substantially transparent or translucent to all the incident radiation, and whose walls may be partially or completely composed of said translucent or transparent materials. The modular containers will have a dual role. They will comprise the walls of the structure, and they will contain the dispersion of microparticles, whose optical properties will give the required reflection.

It will be recognized that the microparticles are an example of a dispersed system, as this term is used in describing colloidal systems, for example. The two phases involved in a colloidal system may be distinguished by the terms "dispersed phase", for the phase forming the microparticles, and the term "dispersion medium" for the medium in which the particles are distributed. The whole may be referred to as a dispersed system. Glasstone, for example, reviews many examples of such systems in his book "Textbook of Physical Chemistry" Van Nostrand (1940) pp 1209.

As an example of an advantageous embodiment one can consider rutile, a crystalline form of titanium dioxide, as the microparticle material, dispersed in water to which a surfactant chemical material has been added, for purposes of dispersion, this liquid being contained in modular boxes of plastic such as lucite or plexiglass. Rutile has a very low ratio of absorption to scattering, and is therefore an advantageous microparticle material since very little of the incident radiation will be absorbed. These modular boxlike containers will hold a substantial amount of liquid dispersion as well as a significant volume of air space, in which transparent foam or glass-wool like spacer material will be present, to act as thermal insulation. The light weight of these containers will permit them to be supported by a relatively light framework of supports and girders. These support frames will be attached to the basic support structure or foundation which holds the building to the earth.

It will be understood that the container modules will provide thermal insulation to minimize thermal conductivity, as well as providing high reflectance for the incident radiation. The thermal insulation can be provided in the form of translucent glass wool or plastic fibers as described above, in separate sections of the module from the microparticle dispersion medium. The thermal insulation can also be provided integrally with the microparticle dispersion in the form of foam. The foam can be produced from a liquid dispersion of microparticles into which a foaming agent, e.g., saponin, has been inserted. A pneumatic pressure source then inserts a large mass of bubbles into this liquid. These bubbles will comprise much of the volume with the container. The bubbles provide the thermal insulation since air space within the bubbles are effective thermal insulators which are physically separate from each other. Although the foam tends to collapse it will be continually regenerated by the pneumatic source.

The radiation reflecting properties of the microparticle dispension will differ significantly from that of a reflecting paint in a number of ways. The microparticle dispersion in a dispersion medium liquid will produce significantly more reflection with much less absorption of the incident spectrum of infrared, visible and ultraviolet radiation than will the paint. The painted surface will absorb considerably more and reflect less of the incident radiation than the microparticle dispersion. This can lead to a significant alteration of the thermal balance for the building.

To understand this, it should be pointed out that a painted surface (also) consists of microparticles suspended within a layer of transparent film polymer deposited upon an opaque surface. The layer thickness is usually quite small, at most a few tens of mils. The microparticle material for a white paint may be rutile, as in the microparticle dispersion liquid within the container module.

The painted surface will be a less effective reflector of radiation, and a greater absorber, than the microparticle liquid dispersion for the following reasons:

(1) The concentration of microparticles in the paint is usually very high. Experiments have shown that the reflecting capability of a given mass of microparticle material is significantly greater in dilute concentration than at high concentration. For equal mass of microparticles per unit area, the container with liquid microparticle dispersion will reflect significantly better than the paint.

(2) The dispersion layer thickness in the container can be much greater than in the paint layer. Therefore even though the microparticle concentration is more dilute in the container, the mass of microparticles per unit area can be significantly greater than in the paint. Since the radiation (transmitted) or absorbed in the opaque surface is $1-R$, where R is the reflection coefficient, the amount of radiation absorbed by the painted surface may be many times greater than in the container.

(3) Since the paint layer cannot achieve sufficient reflection, it is customary to add absorbing pigments to the paint mixture to increase its "hiding power" for the surface. This added absorbing material increases the radiation absorbed by the surface.

(4) The high concentration of microparticles in the paint makes the average particle separation small and makes the effective particle size larger than desired. This is a significant disadvantage for the following reason: It has been shown that resonances occur in the scattering cross section of a microparticle which depend critically on the particle size. A resonance is an optical wavelength interval wherein the scattering cross section is abnormally high. This resonance occurs at a wavelength that is approximately twice the microparticle diameter. An important feature of the present invention is the utilization of such microparticle resonances to selectively reflect certain wavelengths while permitting other wavelengths to be transmitted. It is apparent that in a paint, where the high concentration of microparticles makes it difficult to specify and control the microparticle size, it will not be practical to utilize microparticle resonances to obtain selective wavelength reflection.

(5) A paint surface is directly exposed to the atmosphere permitting it to accumulate depositions of dirt and absorbing material. These surface accumulations can drastically reduce the reflection by the paint and increase its absorption. The microparticle liquid dispersion, because it is held within a transparent container, separates the surface from the reflecting medium. The transparent container material will normally be composed of a hard plastic or glass to which dirt or dust does not adhere, as it does to paint, especially if it is treated with material that develops an electrostatic charge layer to repel incident dust. Furthermore, the transparent container surface can be periodically cleaned with water or air currents to remove any optically dirt that is deposited.

(6) The reflecting properites of a painted surface are drastically affected by warping, cracking, chalking, weathering, and various chemical changes that take place. The transparent container, on the other hand, will be composed of a material which is relatively immune to such changes, e.g., glass, plexiglass, lucite, etc. Hence its reflectance will not degrade with time.

This comparison of the liquid microparticle dispersion within a container with a normally painted surface therefore exhibits the advantages of the dispersion in leading to a greatly diminished absorption of the incident radiation. It has also pointed out the following basic principles which are utilized by the present invention:

a) The dependence of the scattering coefficient of a microparticle dispersion on the concentration of microparticles. In particular, the scattering coefficient is proportional to concentration for low concentrations, but its increase is less than linear as concentration increases.
b) In order to obtain a given reflectance from a microparticle dispersion one requires a specified total number of microparticles of a given size per unit area, normal to the surface. This is determined by the product of liquid layer thickness and concentration. In a paint layer thickness is limited, while in a liquid microparticle dispersion the layer thickness can be much greater, hence the reflectance can be greater.
c) The reflectance of a microparticle dispersion is dependent on the ratio of absorption to scattering within it; any addition of absorbing material to the liquid in the form of pigment or dirt will therefore decrease the reflectance.
d) The reflectance of a microparticle dispersion will exhibit a maximum at a characteristic wavelength if the microparticles have a specified size. The particle diameter will determine an optical wavelength at which the scattering is a maximum, and an optical bandwidth of wavelengths at which optical scattering is higher than normal. This resonance scattering due to the particle size can be utilized to give selective reflection in desired ranges of optical wavelength.
e) Separation of the reflecting layer from the outer wall by use of a transparent container is a useful principle that permits minimizing the effects of external absorbers (dirt) weathering etc.
f) Use of a transparent wall instead of an opaque wall permits radiation to leave the enclosure from the interior, which is useful for cooling applications.
g) An alternate function of the transparent container will be to provide thermal insulation to the building. Much of the thickness of the transparent container will serve as an air space for thermal insulation. This air space can be filled with transparent glass wool, foam, plastic wool or plastic threads to minimize air circulation within it. The alternate functions of the transparent container will result in low thermal insulation costs. One can also attach transparent air current deflectors externally to the transparent container to minimize thermal exchange by convection air currents.
h) Alternate function of the transparent container as a wall element for the building leads to economy in construction. The transparent container module is light in weight and therefore requires only a light weight structural frame. It can be fabricated offsite from economical materials. Furthermore, the fitting together of the container modules into a wall structure will be economical in assembly costs, since the container modules are made to fit into each other.

The principal problem of the liquid microparticle dispersion is settling of the microparticles out of the suspension. This problem can be minimized by including surface active chemicals in the liquid which will tend to perpetuate the dispersion of the microparticles and prevent their dispersion. Many surfactants or surface active agents are known, e.g., potassium tripolyphosphate or tetrasodium polyphosphate for water, or licithin for mineral oil. However, the use of surface active chemicals will slow the settling rate but not prevent settling. It is also necessary periodically to stir, mix, and agitate the liquid suspension. This can be done in various ways, for example, by circulating pneumatically generated bubbles through the liquid.

Another method to prevent settling of the microparticles from going out of suspension is to insert a sol material into the microparticle liquid dispersion which will cause it to gel. The gelation can form a solid matrix which will hold the microparticles in place. Among the gelation agents which can be used are agar agar, gelatin and silicic acid. The principles of gelation will now be presented.

A sol material consists of colloidal particles which are larger in size than molecular but smaller than the size of microparticles. Many sol materials can be converted into a visible solid by various means, e.g., addition of an electrolyte or cooling. Many sols can be converted into a solid called a gel in which the whole system sets into a semi-solid state. This process is called gelation. When a sufficient concentration of the appropriate sols are present, the sol particles link up to form film like surfaces which contain the liquid in which the microparticles are suspended. This gelation process holds the microparticles in suspension within the many small films which are formed by gelation. Thus the use of a gel avoids the problem of microparticle settling out of the liquid.

It will be understood that the microparticles need not be solid. They can be liquid particles as well, provided that these liquid drop microparticles are good optical scatterers with a high index of refraction. The use of liquid microparticles in a liquid dispersion medium is an example of an emulsion. Thus emulsions form a dispersion medium which satisfies the criteria of this invention.

It should be emphasized that the high reflectance attainable by means of the present invention, together with the use of thermal insulation and the selective transmission of ultraviolet and infrared radiation, make it practical to control the thermal balance of a building by these means alone, without a large internal heat source in cold climates, or without air refrigeration cooling in hot climates. This can be shown by comparing conduction and radiation in each case. In these calculations the following values will be used:

Solar radiation effective value = 100 milliwatts per $cm^2$

Thermal conductivity of brick or glass = 40 milliwatts per $cm^2$ per ° C per cm Thermal conductivity of a good thermal insulator, e.g., glass wool = 4 milliwatts per $cm^2$ per ° C per cm The maximum value of solar radiation is 135 milliwatts per $cm^2$ in strong daylight. The 100 milliwatts figure makes allowance for the latitude effect and the sun's angular variation.

Consider first cold climate conditions when the radiation reflecting building is to be used to provide heating: The solar radiation input will be 100 milliwatts per $cm^2$ multiplied by a time duty factor of $\frac{1}{4}$, equivalent to 6 hours per day of strong sunlight. This leads to a solar thermal input of 25 milliwatts per $cm^2$, assuming that the greenhouse effect is used to convert the solar radiation into heat. The thermal loss by conduction is given by $K \cdot (dT/dx)$ where K is the thermal conductivity and $(dT/dx)$ is the temperature gradient. Calculating $(dT/dx)$ as 3° C per cm, and using the thermal conductivity of brick one obtains a thermal outflow of 120 milliwatts per $cm^2$, considerably greater than the solar input. But when the container module holds thermal insulation in the form of an air space plus glass wool, one obtains a thermal outflow of 12 milliwatts per $cm^2$ which is about half the solar input. Hence the present invention permits thermal balance to be controlled in a cold climate.

Under hot climate conditions one should use a time duty factor of $\frac{1}{2}$ for the sun's thermal input, giving a solar input of 50 milliwatts per $cm^2$. With the present invention one can reflect 95% of this radiation to give a solar input of 2.5 milliwatts per $cm^2$. Using the expression $K \cdot (dT/dx)$ for the thermal conduction input, one obtains 2° C per cm for $(dT/dx)$. This gives a thermal current through a brick or glass wall of 80 milliwatts per $cm^2$. However when a good thermal insulator, e.g., glass wool is used to represent the effect of the thermal insulation in the transparent container, one obtains a thermal inflow by conduction of 8 milliwatts per $cm^2$, giving a total thermal input of 10.5 milliwatts per $cm^2$. One will use selective transmission of infrared radiation through the transparent container to radiate the infrared radiation out of the building, in a manner to be described below. From the Stefan-Boltzmann radiation law, which is well known, one can calculate the outward radiation flow. Using the well known formula for this radiation law one obtains the following value for block body radiation at 60° F: 35 milliwatts per $cm^2$, considerably in excess of the thermal inflow. Therefore one can maintain the thermal balance.

Among the types of radiation reflection building which can be considered are the following:

A. Hot climate construction, in which the objective is to prevent heating from external radiation and to remove internally generated heat.

B. Cold climate construction, in which the objective is to obtain internally generated heat while permitting external radiation to enter C. Intermediate climate construction, in which the objective is to combine hot climate construction with cold climate construction In each case the basic mechanism is reflection of some or all of the incident radiation spectrum, while transmission of part of the incident spectrum is of key importance in some cases. Thermal conduction through the transparent container walls may add or remove heat, but this will be minimized by appropriate thermal insulation within the container. Convective heat transfer by wind or air currents will also be minimized by installing air deflectors or buffers on or near the walls to break up the air flow. When thermal conduction and convection are thus minimized, there are many climatic conditions in which the chief effect of heating or cooling a building will take place by optical radiation, where the term optical will include visible, ultraviolet and infrared.

Under such conditions, the use of a highly reflecting wall, for which the reflectance, R, may be 0.90 to 0.99, will greatly decrease the effective radiation, whether from the outside inwards in the case of visible or ultraviolet radiation or in the very near infra-red, or whether from the inside outwards, as in the case of the infrared and far infrared. The principle of decrease of the effective radiation by reflection can be stated as follows: If $\phi$ is the radiation flux in any wavelength range, and if R is the reflectance of a surface, e.g., the microparticle dispersion layer, then the net effective radiation flux $\phi\epsilon$, which is available to be absorbed by or transmitted through the surface is given by $$\phi\epsilon = \phi(1-R)$$

Thus the effect of the reflecting surface is to decrease the effective incident radiation flux by a factor $1-R$. When R can be made to take on values near to unity, the radiation reflecting surface effectively eliminates the coupling to the outside. This effect can be used in a hot climate to prevent outside radiation from coming into the building. In a cold climate this effect can be used to prevent internal radiation from escaping. It should be noted that highly reflecting snow walls can be used to keep an internal region warm, as in an eskimo igloo. Thus the use of high reflectivity surfaces in the form of microparticle dispersions will be an effective and economical means of thermal control.

Both hot climate and cold climate construction can utilize microparticles of specified particle sizes to limit the reflectance of microparticle dispersion, e.g., liquid, layers to a specified wavelength range, e.g., ultraviolet and visible, excluding the infrared. This utilizes the dependence of microparticle scattering on wavelength and particle size which was pointed out above.

Hot climate construction can have the following design. The dispersion, e.g., liquid, layer will contain microparticles whose size is selected to give high reflectance for ultraviolet and visible radiation, and low reflectance for infrared radiation. The external radiation, which is predominantly in the visible and near visible, including ultraviolet and near infrared, will be excluded by reflection. The radiation generated within the building will be in the mid-infrared and the far infrared. It will be transmitted through the dispersion, e.g., liquid or foam, layer to the outside. Thus the building walls will prevent the entrance of external radiation while transmitting internally generated radiation to the outside. This construction will therefore tend to keep the building cool in a hot climate.

It will be understood that a thermal insulating region can be formed in the transparent container which constitutes the wall element by providing air spaces in which air flow cannot take place. The design for such thermal insulating regions which minimize thermal conduction or convection by the air is well known. One can insert glass wool or plastic fibers in large numbers to choke off the possibility of air flow. This leaves static air as the prime volume occupant in the insulating region. Static air is a good thermal insulator. It will be understood that the glass wool or plastic fibers or other filler material, whose purpose is to prevent air flow, will be selected to be translucent to any radiation which traverses the region.

It will be understood that an air foam of a liquid dispersion of microparticles can be an effective thermal insulator as well as a good reflector of incident radiation. The air bubbles of the foam, each bubble separated from the other, comprise the required thermal insulator. A surfactant chemical, e.g., saponin, gelatin or proteins, can give a high foam fraction. It can be produced by bubbling pneumatic pressure through the liquid to form a large mass of bubbles; then the foam must be continually renewed by new production of foam bubbles since the old foam tends to collapse.

It will also be understood that air deflectors or buffers can also be added to the outside surface of the containers to break up any air motion components which might add heat to the wall by thermal convection. The use of air flow deflectors and obstacles to break up air motion is well known. It will be understood that these airflow defelctors can be made of translucent material like the container faces.

It will be understood that a plastic foamed solid which is translucent or transparent is an effective dispersion medium for microparticles. It also functions as a thermal insulation material because of its large volume of air space. It is well known that a variety of plastic materials and processes are available for making foams, some with densities as low as 1 pound per cubic foot, in which over 98% of the enclosed volume is air space. A thermoplastic foam is usually made by mixing a chemical blowing agent with the pellets of powder so that, when subsequently heated, a gas is given off that will expand the liquid plastic into a foamed structure. Rapid cooling will then solidify the plastic in its expanded state.

In the case of a thermoset plastic the thermoset foam is made as follows: A thermoset foam is made by mixing a thermoset resin with appropriate crosslinking and blowing agents, then pouring the mixture into a mold. The mold is heated until the blowing agent breaks down chemically and liberates a gas which expands the liquid mixture. At the same time the heat initiates a chemical crosslinking reaction between the molecules of the plastic which solidifies the thermoset. By properly timing the foaming and solidifying reactions, foamed plastic having any desired density can be obtained. The leading thermoplastics are polyethylene, polystyrene and polyvinyl chloride. The leading thermoset plastics are polyethylene, phenolics, epoxies and polyurethane.

A transparent or translucent plastic is used in the present invention with the addition of the desired concentration of microparticles. Among the plastic materials available to produce translucent foams are: polyethylene, ethylene copolymers, epoxy resin and phoenolics without added fillers, unfilled polystyrene, polyurethanes, vinyl chloride and polyvinyl chloride. Foams of these and similarly functioning materials, can be used in this invention. They are referenced extensively in the plastics literature, e.g., "Guide to Plastics" by McGraw Hill.

An alternative hot climate construction can make use of either a single or a double liquid or foam layer. The outer liquid or foam layer will provide very high reflectivity over the entire optical spectrum, visible, ultraviolet and infrared. Thus external radiation will be back-reflected. Internal radiation in the infrared range can be absorbed by a second liquid layer provided on the inner wall side. This second layer will hold a pigmented microparticle dispersion which will be a thermal absorber because of the internally generated infrared radiation. This inner layer of absorbing liquid will be circulated to a heat removal location, e.g., an evaporation tank. A thermal insulating region will occupy the middle of the container and an air deflector surface can be placed externally.

Cold climate construction requires only a single foam or liquid layer. This layer will permit visible and ultraviolet radiation to enter, since it will hold a dispersion of microparticles with low reflectivity in the visible and ultraviolet. However, it will be highly reflective in the infrared. The high reflectance in the infrared will permit the internally generated infrared radiation to be retained. This will utilize the greenhouse effect in which the ultraviolet and visible radiation can enter, become converted to infrared, and then be retained by the high infrared reflectance. A thermal insulator region and an air deflector are provided to minimize thermal conduction and convection from the outside.

Intermediate climate construction can use either a single foam or liquid reflecting layer on the outside or two such layers, one next to the outer surface and one next to the inner surface of the container. The outer foam or liquid layer will hold microparticles of such size as to make them very good reflectors of ultraviolet and visible radiation, but poor reflectors of infrared. Thus this layer is a good hot climate reflector. The inner layer will be composed of microparticle sizes selected to reflect only infrared, i.e., to be a good cold climate reflector. It will reflect infrared and transmit ultraviolet and visible. One can now vary the thickness or concentration of the two layers to modify the thermal balance. For example, when hot climate construction is required the cold climate layer can be removed, i.e., drained off. When cold climate construction is required, the hot climate layer can be removed.

The objectives of the present invention can be accomplished by means of various structural embodiments to be described, which can be diverse in nature, but all of which operate according to common principles. The basic principles by which the various embodiments of this invention are operative may be described with reference to FIGS. 1, 2, and 3, wherein:

FIG. 1 shows a schematic diagram of a radiation reflecting building,

FIG. 2 shows a schematic diagram of a container module, and

FIG. 3 shows a wall panel or partition based upon these principles.

Referring first to FIG. 1, which shows a schematic diagram of a building including translucent container modules, a basic support structure, designated 1, denotes the foundation or basic support on which the building rests, or to which it is attached. The basic stability of the building derives from this basic support structure, 1, which therefore denotes whatever means is used for this attaching the structure to the underlying level of support. The following are typical of such basic support means which may alternatively be utilised: a concrete foundation, or, support pins or stanchions fastened into the underlying level of support, or, a weighted base, or a base fastened into the underlying structure by support pins. Attached to the basic support structure is a structural framework, denoted 2, which may consist of metal bars or girders or wooden beams. An advantageous structural framework may consist, for example, of lightweight aluminum girders bolted together to form a rigid frame in well known manner and attached to the basic support structure. Attached to this structural framework are at least partially transparent or translucent container modules each containing a dispersion of microparticles, in a translucent or transparent dispersion medium. This dispersion medium of microparticles, which will be described below, is the element to be used for reflecting the radiation. It may also be used for thermal insulation if it is a foam. A minimum of one such container module can be used for the building although typically a number of such modules can be used. There are no limits on the size of the container module; it may comprise an entire wall or several walls of the building, or it may be in the form of a 1 foot by 1 foot block, for convenience in fabrication and assembly.

FIG. 1 shows two such container modules in side view, denoted 3, and two other such container modules, denoted 6, are shown in frontal view. The container modules are attached to the structural framework, denoted 2. Each container module, denoted 3, has at least one transparent surface, denoted 4, and contains a dispersion medium denoted 5, which holds a quantity of microparticles in dispersion, denoted 7. The dispersion medium will be translucent or transparent by itself: the dispersion medium may be a liquid, a foam, or a gel; an advantageous liquid is water, or various light mineral oils. A foam may be based on water using a foaming agent; a gel can also be water based. The dispersion of microparticles will alter the optical properties of the container in a manner to be described.

At least the outer surface of the container module 3 must be composed of a material which is at least partially transparent or translucent, although some of the most advantageous embodiments of this invention require a completely translucent or transparent container, substantially all of whose walls are composed of highly translucent or transparent material. The container walls may be made of glass or of a plastic material of acceptable optical clarity. An advantageous material for the container is acrylic plastic, a polymer of methyl methacrylate, known commercially as plexiglass or lucite. Other plastics with advantageous properties of optical clarity include the following: cellulose acetate, cellulose acetate butyrate, cellulose propionate, nylon, polyethylene, polypropylene, polystrene, vinyl, polyester, teflon, TEF teflon and lexan, a polycarbonate polymer.

It will be understood that the advantageous properties of the dispersion medium, denoted 5, in modifying the optical properties of the container, are derived from the properties of the microparticles dispersed therein. The dispersion medium itself should be sufficiently translucent not to absorb more than a small percent of the radiation incident therein, and in advantageous embodiments of this invention, it will be completely translucent or transparent, absorbing less than 5 percent of the radiation incident therein. The dispersion medium, whether liquid, foam or gel, will be solid or a liquid, as explained above. This liquid should have an optical index of refraction substantially different from that of the microparticles, differing from it by at least 10 percent.

A 10% or greater difference in optical index can be considered substantial because it will lead to a reflection coefficient for the microparticles of about 1% or more. A smaller reflection coefficient would require too high a concentration of microparticles for convenient use.

It will be understood that the microparticles, 7, dispersed in a liquid, will have a tendency to settle out of their dispersed state. This settling tendency can be diminished by using small microparticle sizes, and also by the addition of surfactant chemicals or surface active chemicals, to the liquid 5. However, it will usually be advantageous to provide means, denoted 8, for stirring, mixing or agitating the liquid dispersion to prevent settling. One such means is mechanical circulation of the liquid. An advantageous means for circulating and agitating the liquid is by generation of pneumatic bubbles within the liquid. The agitation means 8, may be comprised of an outlet or inlet for pneumatic pressure to produce air bubbles within the liquid of the container. A pneumatic source, denoted 10, is shown, which may comprise a pneumatic pump or a pressurized air tank, which periodically releases or produces air pressure that is led by a pneumatic tube denoted 9, to said inlet 8. Pneumatic conduits, denoted 11, to carry said compressed air to inlets in the various container modules, can be attached to the structural framework 2.

One important effect of the release of air bubbles is the mechanical stirring and mixing of the liquid. There is also another effect. It has been observed that when air bubbles are released in a liquid in which microparticles are dispersed, the microparticles tend to accumulate at the bubble surface and are held there by surface tension. The microparticle laden bubbles then rise in the liquid because of their bouyancy. This upward motion of the microparticles attached to the bubble surface compensates the downward settling of the microparticles under gravity. Thus a gradual release of pneumatic bubbles in the liquid can compensate the slow rate of settling of microparticles to maintain the dispersion.

Another useful method for agitation of the liquid is to maintain a circulation of the liquid through the containers. Such a circulatory motion can also serve other purposes, e.g., heat removal in a hot climate or thermal addition to prevent freezing in a cold climate. Inlets and outlets for liquid circulation are denoted 12 in FIG. 1. Piping for this circulation is denoted 13, and a circulatory pump is denoted 14.

It will be understood that the consideration above apply when the dispersion medium is liquid. They will not be applicable to a gel for which no settling out of the microparticles will take place. In the case of a foam the microparticles will not settle out but it will be necessary to regenerate the foam by pneumatic bubbling. It will be understood that the pneumatic piping and pressure source described above, including inlets can also be used for maintenance of the foam. A liquid layer will be present near the pneumatic inlet of each container module. This will act as the foam generator in response to the pneumatic pressure by producing large quantities of foam. It will be understood, of course, that when a solid translucent foamed plastic is used this foam is completely stable and there is no necessity for regenerating it; the references to pneumatic regeneration of the foam from the liquid do not apply to this embodiment.

The container modules denoted 3 and 6 show container modules which constitute wall sections of the building. It will be understood that similar container modules denoted 15 may constitute roof sections of the building attached to structural framework for them. It will be understood that said containers will be sufficiently rigid to bear their own weight plus externally applied forces, e.g., wind.

With reference to FIG. 2, which shows a schematic diagram of a container module, denoted 20, the container outer wall surface, denoted 21, is transparent. The container section near the outer wall surface, denoted 22 will contain the liquid, foam, or gel with the dispersion of microparticles. Another container section near the inner wall surface, denoted 23, may also be utilized to hold the medium with a microparticle dispersion, since the use of two separated dispersion medium layers may be advantageous for some purposes, as described above. When a liquid is used as the dispersion medium, between these two liquid containing sections, bounded by transparent walls, will be a thermal insulating section denoted 24, which may contain an air space holding translucent glass wool, plastic fibers or plastic threads, comprising a low density translucent material to prevent air convection within the insulating section 24. It will be understood that the insulating section denoted 24 will comprise a large fraction of the container thickness, and that a predominant volume fraction of the insulating section 24 will be comprised of air space as thermal insulation.

It will be understood that the reflecting liquid section 22 may be omitted and only section 23 may be utilized, in which case the insulating section 24 will also occupy the space denoted 22. Alternatively, the reflecting liquid section 23 may be omitted and only section 22 may be utilized for the reflecting liquid, in which case the insulated layer will also occupy the space 23 near the inner wall. In FIG. 2 the liquid with microparticles dispersed in it is denoted 25. Air flow deflectors in the container surface are denoted by 26.

An alternative method may be used to combine the functions of the reflecting liquid and the thermal insulation. In this case the container sections denoted 22, 23, and 24, may be combined into a single section. The liquid with microparticles dispersed within it will be made into a foam by adding surfactant chemicals and applying a pneumatic nozzle to produce a large number of bubbles in the form of a foam.

Foaming agents are known for many liquids. For water as the liquid, some well known surfactants for the creation of foams are soaps, saponin, albumin, gelatin and other lyophilic foam agents. Lyophobic foam agents such as silicic acid are also available. A review of surfactant agents producing foams are given in such references as: Berkman and Egloff "Emulsions and Foams" Reinhold (1941) and Schwartz and Perry "Surface Active Agents: Their Chemistry and Technology" Interscience (1949). The literature presents many examples of foams with long stability. When a pneumatic source of bubbles is present the foam can be self regenerating. Furthermore, the literature presents many examples of aqueous foam holding a suspension of microparticles. For example, saponin in an 0.001 percent aqueous solution forms a foam whose bubbles form a durable skin.

Berkman and Egloff point out, for example (pp 132–134) that small solid particles may contribute to the stabilization of a froth or foam. Solids may prevent coalescence of bubbles in foam, as in mineralized froths or in an ore flotation process. They point out that it is probable that it is probable that an explanation for the stability of durable foams, as for example those produced by the sea, by beer, or by aqueous solutions of saponin and soap, must be sought partially in the formation of very viscous, semirigid, or gel-like membranes at the interface.

They also point out that the action of finely divided solids improves stability. Dextrin-like substances, and wheat gum produce softer and more elastic skins. The various degrees of stability of a foam often depend on properties of the bubbles and on the nature of the films. Soap bubbles have a smooth flexible surface. On the other hand bubbles of saponin solutions are much more rigid. A sufficient concentration of bubbles is inserted to make the foam a good thermal insulator, which will require a high volume fraction of air in the foam. This foam will have the dual properties of a reflecting liquid and of a thermal insulator. There will be nor problem of settling of the microparticles since the bubbles will be kept in place by surface tension.

It is known that liquids which foam can maintain a more or less permanent difference in surface tension between different parts of the surface, and thus a film is able to establish an equilibrium between its own weight and the surface tensions of different parts of the surface. Water is an ideal fluid as a foaming medium because of its high surface tension and polarity which allows a considerable surface energy difference. Appropriate surfactant chemicals add to this surface tension. Bubbles drain only very slowly by viscous flow and therefore a foam can have a comparatively long life. Foam life is related to surface viscosity and yield values and is dependent on the degree of absorption and consequently on the rigidity of the film. The addition of pneumatic pressure to produce new bubbles maintains the film.

With reference to FIG. 3 which shows a schematic diagram of an inside panel of partition in accordance with the present invention, the basic support structure is denoted by 31. The structural framework of the partition, which is attached to the basic support structure, is denoted by 32. The translucent or transparent container walls are denoted 33 and 36. The liquid with microparticles dispersed within it is denoted as 37. It will be understood that in an internal partition the microparticles may be pigmented to provide for a colored partition. The liquid may be circulated, as described above from a reservoir, denoted 41, by means of a pump denoted 40, through a liquid conduit denoted 39 and through inlets and outlets, denoted 38, into the partition region 37.

The advantage of microparticles in modifying the optical properties of a liquid stem from their high ratio of surface to mass. This permits a low mass concentration of the material to present a large surface area to the optical radiation and to make a large change in reflectance, transmittance or absorption for low volume concentration of material. It has been found that the scattering coefficient of a microparticle dispersion, which is instrumental in causing optical reflection, will depend on the concentration of microparticles. In particular, the scattering coefficient is proportional to concentration for low concentrations, but its increase is less than linear as concentration increases. One of the advantages of a liquid microparticle dispersion is the use of lower particle concentrations than other methods require, e.g., the use of a paint.

Advantageous designs for liquid, foam, or gel, microparticle dispersions can be obtained as follows: If one considers spherical particles one finds that the ratio of surface to mass for a microparticle is $\frac{3}{4}\rho r$, where $r$ is the particle radius and $\rho$ is the material density. For a density of 2.7 gm per $cm^3$, corresponding to rutile, and a radius of 0.5 microns (where 1 micron is $10^{-4}$cm) one obtains a surface to mass ratio of 6000 $cm^2$ per gram. Consider a container with a surface area of 1 square foot with dispersion layer thickness of $\frac{1}{8}$ inch in the container. This will contain about 1000 $cm^3$ of liquid, for example. One gram of microparticles if uniformly dispersed, would produce six times the surface area required, on the basis of single reflections for each optical ray incident on the liquid. Actually, in order to produce a good optical reflecting surface it is necessary to have multiple reflections occur within the material. It will be shown below that a 3% dispersion is sufficient to give 95% reflection. Since the container holds about 1000 gms of liquid per square foot this corresponds to only 30 grams of microparticle material required to make the liquid highly reflective.

An advantageous liquid for use with microparticle dispersions will be translucent, i.e., have relatively little optical absorption over the wavelength range of interest, and will have an optical index of refraction substantially different from that of the microparticle material. Typical liquids for this purpose are water and mineral oils. Typical microparticle materials are the scattering pigments (white) and colored pigments used in paints, if color is to be used. The scattering pigments are typified by titanium dioxide, white lead and zinc oxide. Titanium dioxide in the form of rutile crystals or anatase crystals is a particularly advantageous scattering material because of its high refractive index and its low absorption coefficient. Other scattering materials for use as radiation reflectors are lithopone, basic lead sulfate, antimony oxide, magnesium oxide, and magnesium carbonate.

One can show that a substantial difference in refractive index between the liquid and the microparticle leads to a high reflection coefficient for a single scattering of an optical ray. Fresnels equation gives the following experession for the fraction, R, of light reflected at the interface of the microparticle and the liquid, in terms of the refractive index, $N_L$ of the liquid and the refractive index, $N_p$ of the particle.

$$R = (N_p - N_L)^2/(N_p + N_L)^2$$

Rutile and anatase, two crystalline forms of titanium dioxide, have refractive indices, respectively, of 2.74 and 2.52, while the refractive index of water is 1.33 and of mineral oil is about 1.4. For rutile microparticles in water, for example, the Fresnel equation gives a reflection R of 0.11. It is apparent from this equation that the difference in refractive indices between liquid and microparticle must be substantial, i.e., that the difference $N_p - N_L$ must be a significant fraction of the sum, $N_p + N_L$, of the refractive indices, in order for R to be appreciable. A useful criterion for a substantial difference in refractive index is that $N_p - N_L$ must be greater than 1/10 the sume $N_p + N_L$.

Titanium dioxide is an advantageous microparticle material especially in the form of rutile. Properties of rutile microparticles and of its liquid dispersions have been described by Londergan and Spengeman in the Journal of Paint Technology, April 1970, vol 42, no. 543.

Water is a particularly advantageous liquid for microparticle dispersions. Several surface active chemicals which are useful for dispersing titanium dioxide and other microparticles in water, are tetrapotassium pyrophosphate and potassium tripolyphosphate, as well as tetra sodium polyphosphate. If mineral oil is used as the dispersing liquid, lecithin is an effective surfactant chemical. Many surface active chemicals are available and well known. A review of surface active chemicals is given in "The Science of Surface Coatings" edited by Chatfield and published by Van Nostrand in 1962. It will be understood that the function of surface active chemicals, or surfactants, is to prevent the coalescence of the microparticles by increasing the molecular attraction of the microparticles to the liquid. One interpretation of the role of surface active chemicals is that they decrease the surface tension at the microparticle-liquid interface, thus making the dispersion more stable.

The Fresnel equation refers to a single reflection from a microparticle in the liquid. In practise a light ray suffers many reflections in a microparticle dispersion. The relationship between the microparticle material, the concentration of microparticles (number or mass per unit volume) in the liquid, the thickness of the liquid layer, and the resulting reflection and absorption of the incident radiation, is given by the Kubelka-Munk equations, which are well-known. These are given and discussed in the following references:

"Color in Business, Science and Industry," Judd, John Wiley & Sons, Inc.

"Optics of Light Scattering Materials" P. Kubelka "Journal of Optical Soc. Am." page 448 May 1948

"Pigment Optical Behavior" Mitton & White, Official Digest of Paint Technology Nov 1958

The Kubelka-Munk equations describe the following physical process. A light beam entering the liquid suffers many collisions with the microparticles. Each collision causes reflection, absorption, refraction and diffraction of the light ray, where each of these terms are used in their conventional optical sense. The light ray experiences an attenuation as well as bending back upon itself as the result of this multiple collision process. This results in a back-reflection of the beam, as well as a partial transmission and partial absorption. The Kubelka-Munk equations describe mathematically the effects of the large number of collisions on the back reflection and absorption of the beam. It will be understood that the Kubelka-Munk equations are useful for quantitative design of the concentration and layer thickness of a microparticle dispersion which will have specified reflection, transmission or absorption processes.

The Kubelka-Munk results may be expressed in several equivalent ways which are useful for design purposes. These equations describe the microparticle dispersion in terms of two parameters:

K = absorption coefficient of the microparticle dispersion, giving the fraction of the incident optical energy in a given wavelength range which is absorbed per unit length of optical path S = scattering coefficient of the microparticle dispersion, giving the fraction of the incident optical energy in a given wavelength range which is scattered per unit length of optical range K and S both involve the concentration of microparticles and the fundamental material properties of the individual microparticle. The fraction K/S gives the ratio of absorption to scattering in an individual microparticle and depends primarily on the microparticle material.

The Kubelka-Munk results may be expressed in two equivalent ways which are useful for design purposes:

(1) One can find the reflectance $R_B$ of a layer of liquid of finite thickness T over an optically black substrate (2) One can find the reflectance $R_\infty$ of an infinitely thick layer of liquid, i.e., one that is sufficiently thick that further increase in its thickness will not change its reflectance Using the first form of the Kubelka-Munk equations one obtains the following results, in $$R_B = [a + b \coth sbt]^{-1}$$

$$a = (k + s/s)$$

$$b = (a^2 - 1)^{\frac{1}{2}}$$

I have derived the following formula for microparticle materials with low absorption, for which $K/S \approx 0$. One can show that, to good approximation $$R_B = \frac{ST}{ST + 1}$$

For pure titanium dioxide $K/S \approx 0.002$ to $0.001$ so this is a valid approximation.

This is valid when no extraneous absorber is added to the titanium dioxide, an advantageous situation for the radiation reflecting structure of the present invention.

The first form of the equation is advantageous for a finite layer thickness. The second form is useful as an upper limit for an optically infinite layer. Tabulations of these solutions are available for nonzero absorption values and for finite layer thickness. The second form gives the following result $$K/S = \frac{(1 - R_\infty)^2}{2R_\infty}$$

Note that $R_\infty > R_B$ and that asymptotically $R_B \rightarrow R_\infty$

Some values of $R_\infty$ which correspond to values of the ratio K/S are as follows:

| K/S | $R_\infty$ |
|---|---|
| 0.2 | .53 |
| .1 | .64 |
| .05 | .73 |
| .01 | .87 |
| .002 | .87 |
| .001 | .956 |
| .0005 | .97 |

It is apparent that only when $K/S < 0.2$ can reflectances greater than 50% be achieved. It will be understood that reflectances of at least this magnitude are required for substantial improvements in the thermal balance by use of a radiation reflecting building. Therefore these standards represent the minimal criteria for effective design of radiation reflecting buildings:

(1) The microparticle material shall have a ratio of optical absorption coefficient to optical scattering coefficient of less than 0.2. This condition by itself is a necessary condition for an effective design of a radiation reflecting building.

(2) A further condition independent of that above is that the reflectance shall be at least 0.5 for the incident radiation which is to be reflected. This is implied by the condition above only for a sufficiently thick reflecting layer. For thinner layers, as measured in optical scattering lengths, this condition is independent of the one above.

(3) For radiation reflecting buildings of high performance one should specify a higher reflectance of greater than 0.8. It will be apparent from the disclosures given below that only when the number of optical scattering lengths in the reflecting layer exceeds four can a reflectance of 0.8 or higher be obtained. Since in the most advantageous embodiments of this invention high reflectances are desired, this condition will serve as a criterion for such embodiments.

(4) It has been pointed out above that a necessary condition for this invention is that there must be a substantial difference between the index of refraction of the dispersion medium and the index of refraction of the microparticle material. This substantial difference has been specified as at least 10%.

It will be useful to give an illustrative calculation for the variation of the scattering coefficients with particle radius. This calculation is only schematic, for it omits diffraction and refraction, but it gives the important features of the relation. Let the particle be a sphere of radius $r$ $$S = \frac{\pi r^2}{\frac{4}{3}\pi r^3 \cdot \rho} = \frac{3}{4r\rho}$$

in $cm^2$ per gram of microparticle material, where $\rho$ is the density of the microparticle material. If $\rho_v$ is the density of microparticles in the dispersion one can write $S_v = S \cdot \rho_v$ in units of inverse centimeters.

For titanium dioxide particles with $r = 0.5$ microns radius and $\rho = 3$ gm $cm^{-3}$ one finds that $S = 5000$ $cm^2$/gm For a volume density $\rho_v = 0.05$ gm/$cm^3$ one obtains $$S_v = 5000 \times 0.05 = 250 \text{ inverse cm}$$

Since 1 cm = 400 mils this is equivalent to $$S_v = (250/400) \text{ mils}^{-1} = 0.625 \text{ inverse mils}$$

The expression given above for $S = \frac{3}{4}r\rho$ is based on the assumption that the particles are all spherical and that the density of particles in the dispersion is sufficiently low that the light rays interact with the individual particles, and that the individual particles are no more closely spaced than several optical wavelengths. When they are more closely spaced the dependence of $S_v$ on $\rho_v$ is more complicated and must be experimentally determined. We have seen that $S_v$ is proportional to $S_v$ for low concentrations of particles. The variation of $S_v$ with concentration and with particle size can be calculated from the Kubelka-Munk equations if the reflectance is measured. For given microparticle concentration one can solve for $S_v$ for a measured reflectance $R_B$. The experimental results are given by Bruehlman, Thomas and Gonick in the Official Digest of Paint Technology Societies February 1961. Their results show that the ratio $S_v/\rho_v$ decreases with increasing $\rho_v$, although $S_v$ itself increases with $\rho_v$. They also show that the smaller the particle size the greater is this ratio for a given $\rho_v$. Furthermore these results show that this ratio is independent of $\rho_v$ when $\rho_v$ is less than 0.05 gm per cm³.

One can conclude from such experiments that the scattering coefficient of a microparticle dispersion depends on the concentration of microparticles. In particular, the scattering coefficient is proportional to concentration for low concentrations, but its increase is less than linear as concentration increases. For a given reflectance, the minimum amount of microparticle material will be used if T is large and if $S_v$ is small. A highly concentrated dispersion will not be able to attain a high reflectance in a limited layer thickness.

For most applications of a radiation reflecting building one will desire to maximize the reflectance and minimize the absorptions. When a low absorbing material like rutile is used for the microparticles, the expression given above which we have derived from the Kubelka-Munk equations may be used to calculate the reflectance $R_B$ and the absorption $1-R_B$ $$R_B = \frac{S_vT}{S_vT + 1}$$

I have calculated the microparticle density $\rho_v$ required to give a value of absorption $1-R_B$ for a given thickness T of the liquid layer. $1-R_B$ may be considered the maximum fraction of incident energy whose absorption in the liquid, foam, or gel, layer will be permitted. One can simply find the $S_vT$ product that will give the specified value of $1-R_B$. $S_v$ is calculated from $$S_v = \frac{3}{4r\rho} \cdot \rho_v$$

where $\rho$ is taken as 2.75, corresponding to rutile, and $r$ is $10^{-4}$ cm. The use of this formula will give conservative results for $\rho_v$. A table of values is given below:

| Fraction of Optical Energy Absorbed | S.T. | Microparticle density $\rho_v$ in milligrams per cm³ of liquid T = 90 mils | T = 360 mils | T = 720 mils |
|---|---|---|---|---|
| 20% | 4 | 6.4 | 1.6 | 0.08 |
| 10% | 9 | 14.4 | 3.61 | .18 |
| 5% | 19 | 30.4 | 37.6 | .38 |
| 4% | 24 | 38.4 | 9.6 | .481 |
| 3% | 32.3 | 51.6 | 12.9 | .646 |
| 2% | 49 | 78.5 | 19.6 | .981 |
| 1% | 99 | 159 | 39.6 | 1.98 |
| 0.5% | 199 | 320 | 79.4 | 3.98 |

It should be appreciated that in addition to reflection at the microparticle surface the light ray is deviated by refraction and diffraction. Particles whose diameter bears an appropriate relationship to the wavelength can deflect many times the amount of light which actually would strike the particle. This principle of the large increase in scattering cross section for appropriate particle size to wavelength ratio, has been established by a number of investigations. Some references are:

Bailey in Industrial and Engineering Chemistry, vol 18, no. 6.

Stratton and Houghton, Physical Review, July 1931 pp 159, vol 38.

De Vore and Pfund, Journal of the Optical Society of America October 1947, vol. 37, no. 10, pp 826.

De Vore, Official Digest of Paint Technology Society, April 1964, pp 336-342.

One finds that the ratio of the scattering cross section to the geometric cross section has a maximum for a spherical particle of diameter $d$ when $$\frac{d}{\lambda} \cdot \frac{m^2 - 1}{m^2 + 2} \approx \frac{1}{5}$$

where $\lambda$ = wavelength
where $m$ is the ratio of the dielectric constant of the particle to that of the surrounding medium. For rutile in water, the maximum is about 4 and the $m$ value is about 2. One finds that the optimum particle diameter is $$d \approx 0.4\,\lambda \text{ or } \lambda = 2.5\,d$$

The width of the maximum is fairly broad, $$.015 < \frac{d}{\lambda} \cdot \frac{m^2 - 1}{m^2 + 2} < 0.3$$

corresponding to $$1.67\,d < \lambda < 3.3\,d$$

This gives a wavelength bandwidth of $$\Delta\lambda = 1.6\,d$$

One can conclude that the reflectance of a microparticle dispersion will exhibit a maximum at a wavelength that is characteristic of the particles size and material composition, if the particles are of uniform size. The particle diameter will determine an optical wavelength at which the scattering is higher than normal. This resonance scattering due to particle size can be utilized to give selective reflection in desired ranges of optical wavelength. When particles of several sizes are mixed, the effects are additive in the scattering cross section, with each particle size producing its own resonance effect.

In using the particle size to provide selectively controlled optical reflection and transmission at various wavelengths, it is important to point out that excessive reflectivity should not be provided. For example, for rutile in water the particle diameter is selected to be about 2/5 of the wavelength at which maximum reflectance is desired. This wavelength will then have a much larger scattering cross section than distant wavelengths, although wavelengths within a range of ± 0.8λ from it will also show increased reflectance. The concentration of microparticles will be selected to provide acceptable reflection for this range of wavelengths without any excess reflection capability. This will provide a "just adequate" concentration in the band of wavelengths at which reflection is desired, and an optical path of about one-fourth the maximum at wavelengths where transmittance is desired. For example, if the concentration is selected to give an optical path $S_vT = 10$ at the wavelength of maximum reflection, only 9% of the incident energy will be transmitted. However, at a distant wavelength beyond the reflection band of the particle size the optical path will be $S_vT = 2.5$ and 28% of the incident radiation will be transmitted. This is an example of the selective reflection effect. It is therefore apparent that by limiting the microparticle sizes to a certain range of dimensions one also specifies the range of wavelengths in which optical reflection will be greatest. If the optical reflection for this wavelength range is made no greater than its "just adequate" value, optical reflection outside this range will be considerably less, and the liquid layer will have a large transmission outside this range. Thus the selection of appropriate combinations of microparticle size range and concentration in the optical path can be utilized to produce a reflection and transmission filter in the desired range of wavelengths.

It will be understood that a requirement of a radiation reflecting building is to reduce the non-reflected fraction $1-R_B$ of the incident radiation as low as possible consistent with other design objectives. The containment of the microparticle dispersion within a transparent container is an effective means for this purpose. In order to obtain a given reflectance from a microparticle dispersion one requires a specified total number of microparticles of given size per unit area, normal to the surface. This is determined by the mathematical product of liquid layer thickness and concentration. In a paint the layer thickness is limited, hence the product $S_vT$ cannot be large enough in many situations, while in a liquid, foam or gel microparticle dispersion the layer thickness can be much greater, hence the reflectance can be greater, hence the reflectance can be greater.

The container also prevents absorbing material in the form of external dirt or grime from mixing with the microparticle dispersion. The reflectance of a microparticle dispersion is dependent on the ratio of absorption to scattering within it; any addition of absorbing material to the dispersion in the form of pigment or dirt will therefore decrease the reflectance. Separation of the reflecting layer from the outer wall by use of a transparent container is a useful principle that permits minimizing the effects of external absorbers and weathering. The containing wall may be made of a material from which any deposited dirt or grime can be easily washed or dusted off, by making the wall with a smooth surface to which grime does not adhere, i.e., a transparent plastic like methyl methacrylute. Furthermore this wall may be treated with an electrostatic dust resistant coating. Electrostatic coatings for repelling dust and dirt are well known.

It will be understood that the use of a transparent container wall instead of an opaque wall will permit infrared radiation from within the building to leave the enclosure. This will be useful for cooling the interior. The microparticle liquid or foam or gel dispersion for such an application will be selected to permit substantial transmission of infrared radiation through it, while reflecting the incident visible and ultraviolet radiation, as explained above, by specifying the particle size.

It will be understood that an additional function of the transparent container will be to provide thermal insulation to the building. Much of the thickness of the transparent container normal to the wall will serve as an air space for thermal insulation. It will be understood that this air space must be divided into small cells between which convective air circulation is minimal. This cellular division can be accomplished by filling the air space with transparent glass wool, or with strings or threads of other transparent materials i.e., plastic wool or plastic threads, to minimize air circulation within it. Alternatively the interior of the container can be filled with a liquid or solid foam holding the microparticle dispersion, thus combining the functions of the reflecting liquid layer and the insulating air cellular space, as described above. This will require a low continuous air overpressure to continually regenerate the foam from the liquid. It will also require a foam composition in which air bubbles preponderate in volume over the liquid volume in order to obtain sufficient thermal insulation. Foaming agents for producing this foam composition have been described above. A solid plastic foam, of course, obviates these considerations.

It should be realized that when adequate thermal insulation is present, the thermal balance in the building can be controlled by reflecting or absorbing the radiation, as pointed out above.

It is apparent that the thermal insulating function of the translucent container can be accomplished at low cost. It will also be realized that one can place translucent air current deflectors external to the translucent container to minimize thermal exchange with the walls by convection air currents. Such deflectors may either be attached to the containers, or they may simply be placed nearby at appropriate points to deflect air and wind streams.

It will be realized that one of the significant advantages of the radiation reflecting building is that of economy in construction. The translucent container module can be light in weight and therefore requires only a light weight structural frame. It can be fabricated off-site from relatively inexpensive materials under factory conditions. Furthermore, the fitting together of the container modules into a wall structure will be economical in assembly costs, since the container modules may be made to fit into each other. The need for stirring or agitation to prevent the settling of microparticles can be satisfied in at least four ways which have been pointed out: (a) a pneumatic pressure system to introduce bubbles into the liquid microparticle dispersion; (b) continued circulation of the liquid; (c) use of a foam-producing liquid which will suspend the microparticles in a continuous foam suspension when subjected to a pneumatic pressure source; (d) in the form of a gel or of a foamed plastic. It will be understood that the requirements of the first three methods can be met by maintaining a connected flow of air or liquid from one container to another, or alternatively by having flow of air or liquid take place from conduits into the containers, or by using a combination of these two methods.

It will also be understood that other methods can be used for producing the stirring and agitation required to prevent settling of the microparticles, and that the four methods described above are not exclusive.

It will be understood that the economic advantages in construction of the building described above are present even when the container modules are not translucent but pigmented or opaque, or when the container modules do not hold a reflecting microparticle dispersion. In this embodiment the present invention includes the use of a multiplicity of modular containers fitting together to comprise walls, partitions, roofs or other sections of the building wherein each set of container modules is supported by the light weight structural framework described above. The container modules may be composed of polymerized plastic material as described above. The modular containers will hold thermal insulation material. The container modules are light in weight and therefore require only a light weight structural frame. The container modules are fitted together into a wall structure which is economical in assembly costs since the container modules may be made to fit together for support, with ultimate support from the structural frame. The use of a foam producing liquid as the filling material for the containers provides a simple and effective thermal insulation. The containers may be connected to a pneumatic source for introducing bubbles into the foam producing liquids. Alternatively, the thermal insulating material may be a foamed plastic solid. Although the use of opaque containers, or of pigmented containers or of container modules without microparticle dispersion, will not give the advantages of radiation reflection, this may not be essential in many circumstances. However the outstanding advantages of economy of construction will nevertheless be present, and will constitute a sufficient advantage for this mode of construction in the present invention. The container module may be composed of a polymerized plastic material of any of the compositions described above, or of glass or ceramic.

The use of a foamed plastic as the dispersion medium for microparticles within a translucent container module gives the advantage of thermal insulation in a solid medium for microparticles. It will be understood that translucent foamed plastic materials are commercially available, and that such materials can be fabricated with a microparticle dispersion within them.

It will be understood that the transparent or translucent containers can be utilized as windows. The presence of the liquid microparticle dispersion within such a window container will render the window opaque. The removal of the liquid microparticle dispersion from the container will permit visibility through said window. The liquid can be inserted or removed by circulating it into or out of the container, by any means of liquid movement.

It will also be understood that internal walls and partitions can be made from such transparent container structures as pointed out above. The internal walls can be similarly rendered either opaque or transparent by inserting the liquid microparticle dispersion into them by any means for liquid movement.

While the description of radiation reflecting buildings and structural embodiments relating thereto have been set forth above, it will be appreciated that other obvious variations can be made in carrying out the invention disclosed herein. Accordingly, such variations falling within the purview of this invention may be made without in any way departing from the spirit of the invention or sacrificing any of the attendant advantages thereof, providing however that such changes fall within the scope of the claims appended hereto.

What is claimed is:

1. A radiation reflecting building comprising in combination:

(a) a basic support structure, (b) a structural framework attached to said basic support structure, (c) at least one container module with at least one translucent surface, supported by said structural framework, (d) a translucent dispersion medium within said container module, and (e) a quantity of microparticle material in the form of microparticles dispersed within said dispersion medium, wherein the index of refraction of the microparticle material differs substantially from that of said dispersion medium and wherein the microparticle material has a ratio of optical absorption coefficient to optical scattering coefficient of less than 0.2, and wherein the concentration of microparticles in the dispersion medium and the container internal dimension perpendicular to said container surface provide an optical path length through said dispersion medium layer of at least four scattering lengths.

2. A radiation reflecting building as defined in claim 1 wherein the dispersion medium is a gel.

3. A radiation reflecting building as defined in claim 1 wherein the dispersion medium is a foamed solid.

4. A radiation reflecting building as defined in claim 1 wherein the microparticles are dispersed in a translucent polymerized plastic foam.

5. A radiation reflecting building as defined in claim 1 wherein said dispersion medium is a gel whose sol material is selected from the group consisting of gelatin, agar-agar and silicic acid.

6. A radiation reflecting building as defined in claim 1 wherein the microparticle material is in the form of liquid drops and the dispersion is an emulsion.

7. A radiation reflecting building as defined in claim 1 wherein the dispersion medium is a liquid.

8. A radiation reflecting building as defined in claim 1 wherein the dispersion medium is a foam.

9. A radiation reflecting building as defined in claim 1 wherein at least one said container module includes an air space region containing translucent thermal insulating material.

10. A radiation reflecting building as defined in claim 1 including a multiplicity of container modules fitting together to comprise a reflecting wall.

11. A radiation reflecting building as defined in claim 1 wherein said translucent surface of said container module is composed of a polymerized plastic material.

12. A radiation reflecting building as defined in claim 1 wherein said container modules are fabricated of translucent material selected from the group consisting of cellulose acetate, cellulose acetate butyrate, cellulose proprionate, nylon, polyethylene, polypropylene, polyvinyl ester, polyester, polycarbonate, polymethyl methacrylate and polytetrafluoroethylene.

13. A radiation reflecting building as defined in claim 1 wherein said microparticles are liquid drops.

14. A radiation reflecting building as defined in claim 7 wherein the microparticle material is titanium dioxide and the liquid is water.

15. A radiation reflecting building as defined in claim 1 wherein the microparticles are in the size range of 0.1 to 10 microns.

16. A radiation reflecting building as defined in claim 1 including means of stirring and agitating said microparticle dispersion.

17. A radiation reflecting building as defined in claim 7 wherein said liquid dispersion is circulated through said container modules by means of inlets and outlets in said container modules.

18. A radiation reflecting building as defined in claim 1 wherein the microparticle material is selected from the group consisting of rutile, anatase, white lead, basic lead sulphate, zinc oxide, lithopane, antimony oxide, magnesium oxide and magnesium carbonate.

19. A radiation reflecting building as defined in claim 1 wherein the microparticle sizes, the microparticle concentration, and the dispersion layer thickness are selected for transmission of short optical wavelengths and reflection of long optical wavelengths.

20. A radiation reflecting building as defined in claim 1 wherein the microparticle sizes, the microparticle concentration and the dispersion layer thickness are selected for transmission of long optical wavelengths and reflection of short optical wavelengths.

21. A radiation reflecting building as defined in claim 1 wherein at least one of said container modules has air flow deflectors.

22. A radiation reflecting building as defined in claim 1 wherein at least one said container has at least two separate compartments, each for an independent microparticle dispersion.

23. A radiation reflecting building as defined in claim 1 wherein the dispersion medium is selected from the group consisting of foamed liquid, emulsion, gel, and foamed solid.

24. A radiation reflecting building as defined in claim 1 wherein the dispersion medium is selected from the group consisting of water, water with added sol material, water with added emulsifier, and foamed polymeric plastic.

25. A radiation reflecting building as defined in claim 1 wherein the dispersion medium is selected from the group consisting of mineral oil, mineral oil with added sol material, and mineral oil with added emulsifier.

26. A radiation reflecting building as defined in claim 1 wherein the dispersion medium is selected from the group consisting of water, water with added sol material, and water with added emulsifier.

27. A radiation reflecting building as defined in claim 1 wherein the dispersion medium is water with an additive selected from the group consisting of foaming agent, sol material and emulsifier material.

28. A radiation reflecting building as defined in claim 1 wherein the dispersion medium is water with an additive selected from the group consisting of soap, albumin, saponin, gelatin, agar agar, silicic acid, emulsifier material and surfactant material.

29. A radiation reflecting building as defined in claim 1 including means for insertion and removal of alternate microparticle dispersions corresponding to varying external conditions.

30. A radiation reflecting building as defined in claim 1 wherein surfactant chemicals are included in said dispersion.

31. A radiation reflecting building as defined in claim 1 wherein at least one said translucent container module has at least one transparent surface.

32. A building partition panel comprising a structural framework; at least one container module with at least one translucent surface, said module being supported by said framework; a translucent dispersion medium within said module; and a quantity of microparticle material in the form of microparticles dispersed within said medium, the index of refraction of the microparticle material differing substantially from that of said medium and wherein the microparticle material has a ratio of optical absorption coefficient to optical scattering coefficient of less than 0.2, and wherein the concentration of microparticles in the dispersion medium and the container internal dimension perpendicular to said container surface provide an optical path length through said dispersion medium layer of at least four scattering lengths.

33. A radiation reflecting building comprising in combination:

(a) a basic support structure,
(b) a structural framework attached to said basic support structure,
(c) at least one container module with at least one translucent surface, supported by said structural framework,
(d) a translucent dispersion medium within said container module,
(e) a quantity of microparticles dispersed within said dispersion medium, wherein the index of refraction of the microparticle material differs substantially from that of said dispersion medium and wherein the microparticle material has a ratio of optical absorption coefficient to optical scattering coefficient of less than 0.2, and
(f) means of stirring and agitating said microparticle dispersion, wherein pneumatic pressure is utilized as the means for agitation by formation of air bubbles which move upward through said microparticle dispersion within said container module.

34. A radiation reflecting building comprising in combination:

(a) a basic support structure,
(b) a structural framework attached to said basic support structure,
(c) at least one container module with at least one translucent surface, supported by said structural framework,
(d) a translucent foam dispersion medium within said container module,
(e) a quantity of microparticles dispersed within said dispersion medium, wherein the index of refraction of the microparticle material differs substantially from that of said foam dispersion medium and wherein the microparticle material has a ratio of optical absorption coefficient to optical scattering coefficient is less than 0.2, and wherein pneumatic pressure is utilized to produce said foam by bubbling air through a dispersion of microparticles in a liquid containing a surfactant foaming agent.

35. A radiation reflection building as defined in claim 31 wherein said liquid is water and said surfactant foaming agent is saponin.

36. A radiation reflecting building as defined in claim 31 wherein said liquid is water and said surfactant foaming agent is selected from the group consisting of soaps, albumin, gelatin and saponin.

37. A modular building comprising in combination:

(a) a basic support structure,
(b) a structural framework attached to said basic support structure, and
(c) a multiplicity of container modules fitting together to comprise a wall section, supported by said structural framework, and wherein said container modules contain a foamed liquid thermal insulating material and wherein said container modules are fabricated from a polymerized plastic.

* * * * *